United States Patent [19]

Koop

[11] Patent Number: 5,636,722

[45] Date of Patent: Jun. 10, 1997

[54] STORE FOR INDIVIDUAL PRODUCTS

[75] Inventor: Franz Koop, Hanover, Germany

[73] Assignee: Klockner Hansel GmbH, Hanover, Germany

[21] Appl. No.: 412,549

[22] Filed: Mar. 29, 1995

[51] Int. Cl.[6] .................................................. B65G 1/00
[52] U.S. Cl. ........................................................ 198/347.1
[58] Field of Search ........................................... 198/347.1

[56] References Cited

U.S. PATENT DOCUMENTS

| | | | |
|---|---|---|---|
| 1,772,047 | 8/1930 | Johnsen. | |
| 1,837,605 | 12/1931 | Baker. | |
| 2,260,528 | 10/1941 | Levy et al. | 211/1.5 |
| 3,833,133 | 9/1974 | Friedrich | 214/16.4 |
| 5,339,942 | 8/1994 | Gasser et al. | 198/347.1 |
| 5,350,050 | 9/1994 | Franke | 198/347.1 |

FOREIGN PATENT DOCUMENTS

| | | |
|---|---|---|
| 0 534 902 | 9/1992 | European Pat. Off.. |
| 2195560 | 3/1974 | France. |
| 3644991 | 8/1988 | Germany. |
| 1035884 | 3/1965 | United Kingdom. |
| 8304404 | 12/1983 | WIPO ................... 198/347.1 |

*Primary Examiner*—James R. Bidwell
*Attorney, Agent, or Firm*—Hopkins & Thomas

[57] ABSTRACT

A store for work products conveyed along a storage line from an input station to an output station is disclosed. The input station and the output station of the store are constructed and arranged to be operated independently of the other. The store also has a plurality of gondolas, each gondola having a plurality of carrier plates for carrying work products thereon. A first generally circular and continuous conveyor at the input station lifts the gondolas off of the storage line, moves the gondolas through the input station for the placement of work products thereon, and then places the gondolas back onto the storage line for travel to the output station. At the output station a second generally circular and continuous output conveyor lifts the gondolas off of the storage line, moves the gondolas through the output station so that the work products may be removed therefrom, and then places the gondolas back onto the storage line.

13 Claims, 7 Drawing Sheets

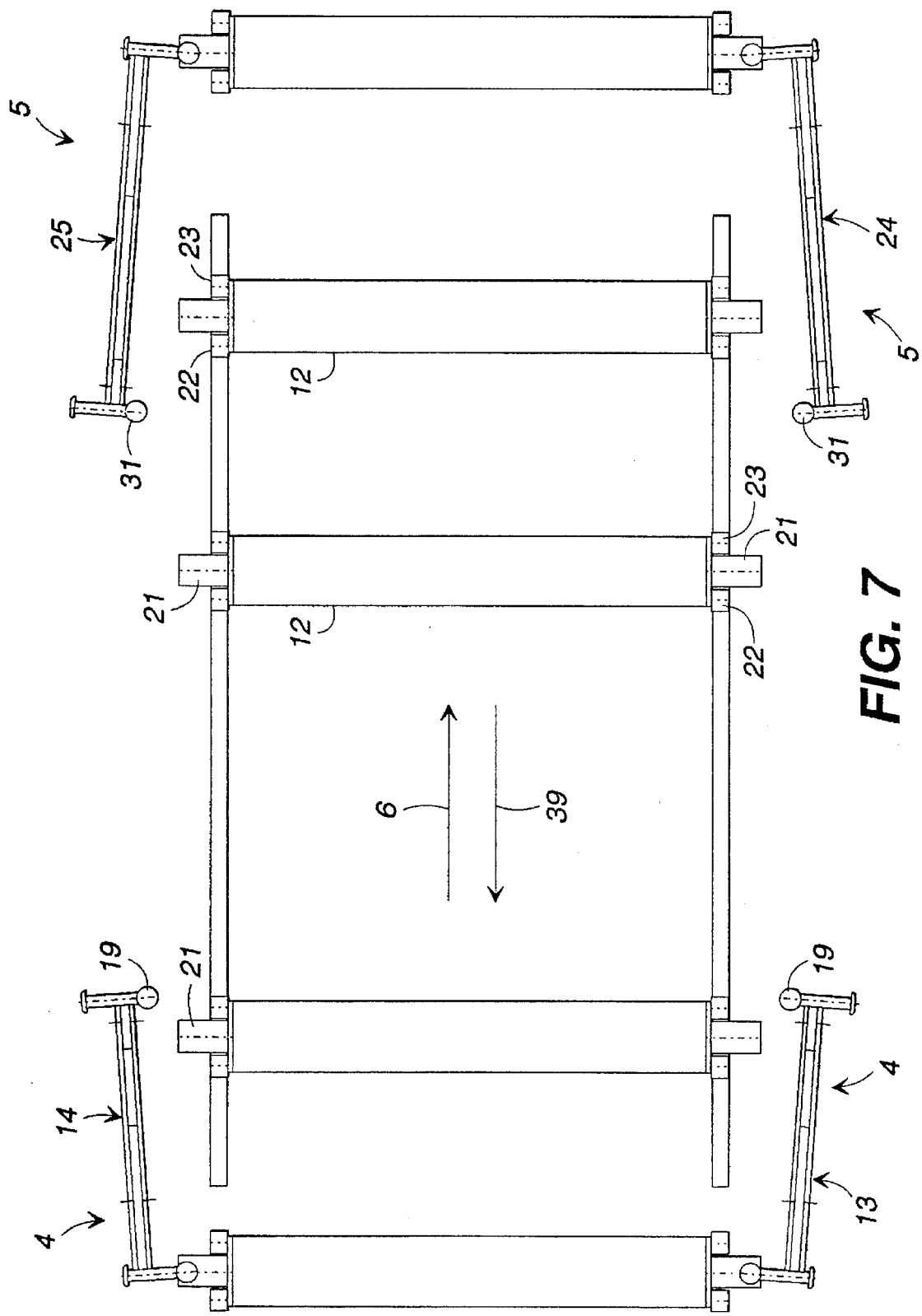

5,636,722

STORE FOR INDIVIDUAL PRODUCTS

FIELD OF THE INVENTION

The invention refers to a store for individual products. More particularly, this invention relates to a store having a storage line extending between an input station and an output station in which the input station and the output station each has an elevator independently operable of the other for moving a series of gondolas thorugh the input and output stations, respectively, and for lifting the gondolas off of, and placing the gondolas back on, the storage line.

BACKGROUND OF THE INVENTION

With the production and packaging of, in particular, confectionery, for example large or small chocolate bars, the problem often ensues that the production machine is continuously operated for technical production reasons, while the packaging machine or plant is shut down during intermediate periods. Such intermediate periods can be caused by breaks prescribed for the operations in the packaging plant or through a fault, for example, changing a roller, at one or several packaging machines in the packaging plant. During all of these intermediate periods, the individual products supplied by the production machine must be transferred to a store. The store is then able to be emptied after these intermediate periods in that the unpacked individual products are then fed to the packaging plant.

A store of the above-mentioned type is known from DE 41 35 241 C1. The store comprises an input station and an output station which can be actuated independently of each other. Between the input station and the output station there is a storage line with a variable receiving capacity. Carrier plates for receiving the individual products as well as a conveying facility for transporting the carrier plates in a roughly circular motion through the store are also provided. The conveying facility consists of a plurality of single elements and separate drives. Thus, in the area of the input station an input elevator is provided and in the area of the output station an output elevator is provided for building up and working through full product stacks. The storage line between the input elevator and the output elevator is adapted for the common conveying of the stacks under congestion collecting in front of the output station of the output elevator. A separate input conveyor having its own drive is provided to transfer the carrier plates with the products lying thereon from the input elevator to the storage line. The same goes for the transfer between the storage line and the output elevator. An output conveyor with a separate drive is thus necessary. The number of the individual elements of the conveying facility and the number of the single drives is large in this type of known store. The operation of the input conveyor and the output conveyor may limit the performance of the store depending on the construction of these elements, whereby it may be necessary, for example, to stop the input elevator during the operation of the input conveyor. If the conveying paths of the input elevator and the input conveyor, cross each other this disadvantage is not only concerned with the forward stroke of the input conveyor but also with the backward stroke of the input conveyor. In this known store the carrier plates are freely movable in the store, making it possible to stack the empty carrier plates directly one above the other so that there is only the need of a small storage space. It is advantageous that more than 50% of the volume of the store may be used for the storage of carrier plates filled with individual products. Full stacks containing different numbers of carrier plates may be created from the carrier plates to have the possibility to quickly start product output from the store after starting the input. This known store however, still needs a plurality of single drive elements and drives.

A further store is known from U.S. Pat. No. 4,168,776. The essential component in this store is an endless chain which is wound around chain wheels. One portion of the chain wheels is fixed locally, while others of the chain wheels, assembled in pairs, are arranged so that they can move vertically. An input station and an output station, separate from the input station, are built onto the store and can be operated independently of each other, i.e. the store can be filled or emptied according to requirements. Therefore, the store can either be filled or emptied. In addition, it is possible to empty the store while also filling it, whereby completely different speeds can also be used. The known store has a relatively large dead area, i.e. roughly 50% of its volume serves only to merely convey the individual products through the store. Before the first individual item can be picked up again from the output station, the store must be filled to approximately half of its volume. Only the remaining half of its volume forms the storage line with a variable receiving capacity. If one of the essential properties of a store is to be able to allow removal of product at any time or to make this possible in a relatively short time, then the ratio of storage lines with a variable receiving capacity to the ratio of the dead space serving only for conveying product is relatively unfavorable. This means that such a store needs to be built relatively long and high if its storage line with a variable receiving capacity is to be, or needs to be, sufficiently large. The endless chain has carrier plates for receiving the individual products and a conveying facility for transporting the carrier plates on the chain in a roughly circular motion through the store is provided, whereby the individual drive wheels form a part of the conveying facility. Owing to the arc-like change of direction of the endless chain at the chain wheels, and the step-wise or jogwise transfer of the chain at the various positions, forces ensue at the change of direction positions which act on the individual products in a direction parallel to the main lengthwise plane of the carrier plates. In order to prevent the individual products from slipping off of the carrier plates and dropping down, the carrier plates must either have an appropriate shape or other measures must be applied.

It is clear that the peripheral speeds at the chain wheels are limited. The performance of such a store is thereby limited. In addition, such stores have the speciality in that the individual products can be removed again in the same sequence as they were fed therein i.e. the first individual item fed into the store is the first one to be taken out again.

For applications involving the storing of confectionery products, in particular large and small chocolate bars, it is known, based on the pricipal arrangement of the stores described above, to use gondolas which are connected via an articulated joint to an endless chain. These gondolas have a certain number of carrier plates above one another, for example, five carrier plates, whereby each carrier plate is designed and built to receive a row of confectionery items thereon. The pitch between the carrier plates within a gondola is, therefore, smaller than the distance of the lowest carrier plate of a first gondola from the uppermost carrier plate of a following gondola. The larger difference at this point is designated as a gondola gap or a gondola jump. On the other hand, however, this enables the gondolas to be able to negotiate the change of direction at the chain wheels, whereby the carrier plates always remain in a horizontally-aligned position. As the naked, unpacked items of confectionery are slid onto flat carrier plates, it is not possible to vary the shape of the carrier plates. The articulated suspension of the gondolas allows, on the one hand, the change of direction around the chain plates, and on the other the negative influence of the accelerating forces upon further movement of the endless chain is reduced. The disadvantage with such gondolas is that the steps in which the endless chain moves to the next stage, for example, in the area of the input station, must be of different a largeness. The larger path corresponds to the gondola gap and this gondola gap thereby determines the performance of the store because this movement represents the greatest load (stress) on the confectioneries. No confectionery product may fall from the carrier plate at the gondola. To bridge over the pitch between the carrier plates of a gondola, a similary large timespan as with overcoming the gondola gap is ready, so that a comparatively low speed is used.

The other disadvantage of such stores equipped with gondolas is that owing to the way the change of direction occurs, the store needs to be built to be very large although its storage line with a variable receiving capacity is relatively small. The sliding of the confectionery items onto the carrier plates in the area of the input station, and the sliding off from the carrier plates in the area of the output station puts corresponding loads on the items of confectionery because sliding friction has to be overcome. Incidentally, the push-on process must be so performed that the item of confectionery lies symmetrically about the hinge point of the gondola, or rather a vertical plane which passes through this hinge point. This means that with alternating confectionery formats, different paths have to be traced during the push-on process and/or carrier the plates, and gondolas matched to the format and shape of the format and shape of respective case in question need to be used on such stores.

A further disadvantage is that all gondolas in the store must be moved during certain operation conditions. For example, this is the case when a completely empty store with respect to its dead space, i.e. with respect to its storage line with a constant receiving capacity, is to be filled.

Furthermore, it is a disadvantage that with the known stores, the carrier plates fixed to the gondolas are difficult to clean, and is practically impossible to do during normal, continuous production. only if the store and the associated plant is shut down it is possible to carry out the tedious cleaning needed.

SUMMARY OF THE INVENTION

It is an object of the invention to make available a store of the aforementioned type which has a reduced number of single drives yet still provides an acceptable level of performance.

According to the invention, this is achieved by the store of the type described above in which the carrier plates forming a full stack are each supported on a gondola, with one circular conveyor provided as an input elevator, and another circular conveyor is provided as an output elevator, and each circular conveyor including carrier lugs for the gondolas, the circular conveyors being guided via deflection rollers fixedly arranged and located in a conveying plane which is approximately parallel to the direction of motion of the gondolas in the storage line.

The invention starts from the fact of not using freely movable carrier plates, but to unite a number of carrier plates together forming a full stack in the form of a gondola, as is known in the prior art. This makes the conveying easier in the storage line. It is not necessary to transport full stacks of carrier plates by touching each individual carrier plate in the storage line, but only to touch each gondola. The same applied to the storage line for empty gondolas leading from the output elevator to the input elevator. By designing the input elevator and the output elevator in the form of circular conveyors, and by the special arrangement with respect of their conveying planes to the direction of the motion of the gondolas, the circular conveyors fulfill a double function. Compared with the prior art, on the one hand, they solve the purpose of an input elevator and an output elevator, and on the other hand they fulfill the function of an input conveyor and an output conveyor. This reduces the number of the single drives needed. Arranging the carrier plates fixedly on gondolas determines the number of carrier plates in the stack, despite this an increase in performance is possible because the performance is limited only by the gap between the gondolas. To overbridge the gap of the gondolas the individual confectionary products are moved perpendicularly on and with the gondola, i.e. perpendicular to the lengthwise direction of the individual products. The input conveyor and the output conveyor of the prior art have to transport the carrier plates with the individual products lying thereon in one step in the lengthwise direction of the products and thus according to the width of the carrier plates, whereby the performance of the store is limited. The stability of the carrier plates is of certain importance also. Arranging the carrier plates fixedly on gondolas improves the stability and stiffness of the carrier plates. The arrangement of the carrier plates and of the deflection wheels allows for the possibility of using more than one step of operation to reach a change in the direction of transporting the gondolas. Thus, this limit to the performance of the store is avoided. This concerns the change of the carrier plates in the direction of movement from the vertical direction in the area of the input elevator to the horizontal direction in the area of the storage line. The same goes to the change of direction between the storage line and the output elevator. Furthermore, gondolas can be handled easier in the storage line than full stacks of individual carrier plates.

The free end of the conveyor feeding the individual products to the store and facing the store and/or of a conveyor carrying away the individual products from the store is displaceably arranged in the vertical direction for the purposes of bridging the gap between succeeding gondolas. Thus, the number of individual drives in increased but there is the possibility to overbridge the gap between succeding gondolas and to shift the individual items of the products to the carrier plates on the gondolas continuously to avoid a step by step interruption of movement. The gap between succeeding gondolas has no disadvantage. There even is the possibility to rotate the circular conveyors permanently, avoiding a jog mode, and to raise the free end of the feeding conveyor with the arriving individual products with respect to the permanent motion of the circular conveyor during the transfer of the indivudual products from the feeding conveyor to the circular conveyor. The feeding conveyor and/or the conveying belt may be arranged displaceably in the vertical direction parallel to itself or pivotable about the axis of the deflection roller not facing the store.

Each circular conveyor comprises two chains equipped with carrier lugs and located in conveying planes to the left and to the right in the area of the input station and the output station. Each circular conveyor has two chains with two carrier lugs each adapted to contact the gondolas. The conveying planes of the circular conveyors are arranged approximately parallel to the direction of movement in the storage lines for both full and empty gondolas.

The carrier plates may be located on the gondolas at a distance with respect to each other in the amount equal to half the value of the gap between succeeding gondolas. The gap or jump between two succeeding gondolas is equal to the distance between a carrier plate and the next carrier plate. Other dimensions may be designed.

The storage line for the gondolas filled with individual products and the storage line for empty gondolas located between the output station and the input station are each equipped with sliderails, on which the gondolas are supported in a hanging condition. This makes the handling of the carrier plates on the gondolas easier in the area of the two storage lines.

Each chain of each circular conveyor is guided by at least four deflection rollers, the arrangement of which determines the conveying plane. The deflection rollers are constructed and located in a manner to fulfill the tasks of the elevators on the one hand, and of the input and output conveyors on the other hand, and finally to work as the conveyors for the transport of empty gondolas to and from the second storage line.

A sluice may be provided in the conveying and storage line for empty gondolas to take out empty gondolas and to reintroduce them into the cycle. In this manner the number of gondolas within the store may be increased or decreased.

Each circular conveyor may comprise portions inclined both upwardly and downwardly to pick up and to put down the gondolas. With these portions it is thus possible to effect the transfer of the gondolas to and from the sliderails at the two storage lines.

Each gondola may comprise two pairs of rollers located at a vertical distance with respect to each other and take up elements located between the pairs of rollers to contact the carrier lugs. The upper pair of rollers is located above the take up element. The lower pair of rollers is located below the take up element. This makes it possible to put down the gondolas in the area of the first storage line, adapted to receive full gondolas, on the sliderails in a hanging condition on the upper pair of rollers. Conversely, in the second storage adapted to receive empty gondolas, the gondolas are hanging on the lower pair of rollers.

The circular conveyors with their conveying planes may be located in an inclined manner with respect to the plane of motion in the storage lines and in an amount sufficient for coming into or out of contact of the carrier lugs on the chains and the take up elements on the gondolas. This gives a simple possibility for the interaction of the carrier lugs, the pairs of rollers, the take up elements and the sliderails.

BRIEF DESCRIPTION OF THE DRAWINGS

The invention will be further described by means of a preferred embodiment example. The drawings show in.

DETAILED DESCRIPTION

Figure 1:
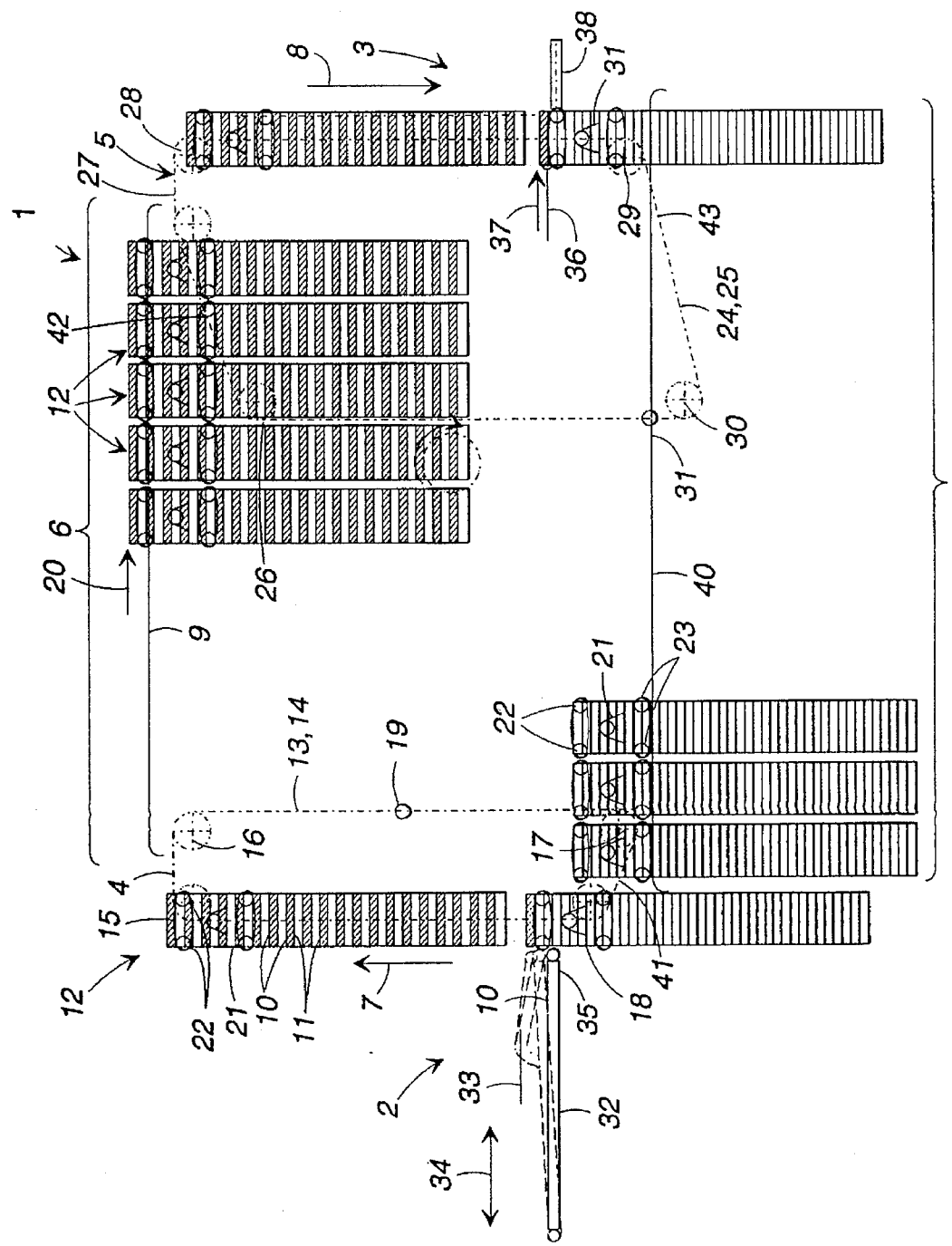
FIG. 1 a vertical cross-section through a preferred embodiment of the store while in operation, FIG. 2 a cross-section through the store with the first storage line being in a loaded condition during output operation, FIG. 3 a cross-section through a the completely empty store, FIG. 4 a cross-section through the store at an intermediate point of operation, FIG. 5 a front view of the store, perpendicular to the drawing plane of FIG. 1, FIG. 6 a top view of the store in a first preferred embodiment, FIG. 7 a top view of the store in a second preferred embodiment.

The essential parts of this invention are illustrated schematically in a vertical longitudinal cross-section through the store 1 as shown in FIG. 1. There is an input station 2 and an output station 3. A first circular conveyor 4 is shown at the input station 2 and a second circular conveyor 5 shown at output station 3. The principle design features of circular conveyors 4 and 5 are identical, whereby the circular conveyor 4 moves upwardly, continuously, in jog mode, while the circular conveyor 5 serving for the output operation moves downwardly, progressively, in jog mode. The circular conveyor 4 not only serves for input elevator, i.e. to not only raise the individual products vertically upwards, but also fulfills the function of an input conveyor in the horizontal direction into a storage line 6. This also applies to the circular conveyor 5. The circular conveyor 5 leads the individual products out of the storage line 6 in a horizontal direction, thus fulfilling the objects of an output conveyor and of an output elevator, i.e. a conveying operation downwardly in the vertical direction. The running direction of the circular conveyor 4 is indicated by an arrow 7. The circular conveyor 5 moves according to the direction of an arrow S. Horizontal sliderails 9 are arranged in the area of the storage line 6 with a variable receiving capacity. The store serves for the reception of individual products 10 which lie on carrier plates 11. The carrier plates 11 are mounted on gondolas 12 in fixed or detachable fashion.

Figure 5:
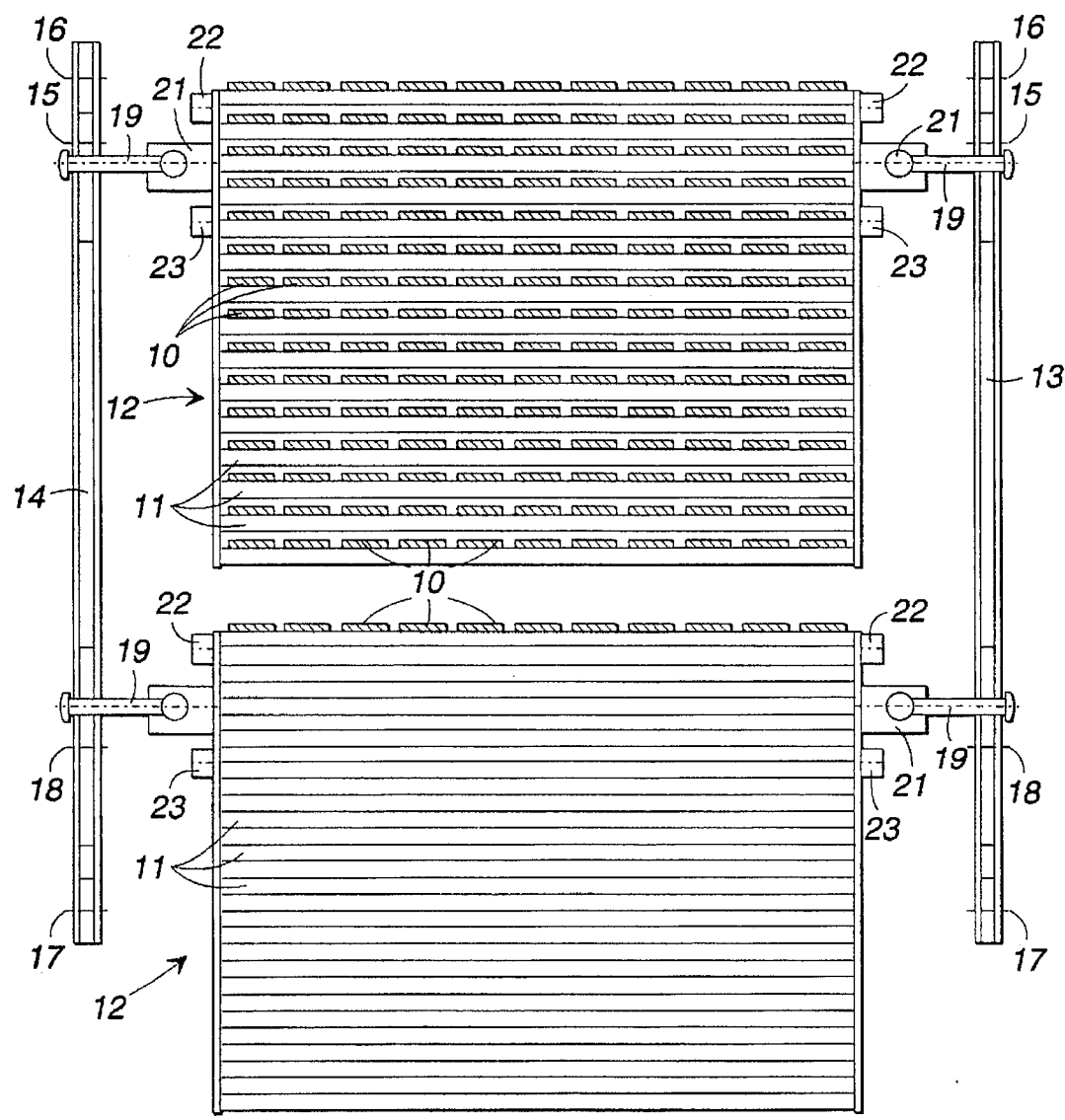

The circular conveyor 4 comprises two chains 13 and 14 which are located to the right and left of the input station 2 (FIG. 5). The chains 13 and 14 run over deflection rollers 15, 16, 17, 18 and are provided with carrier lugs 19. The circular conveyor 4 creates a plane by its running chain 13 which lies parallel to the plane of movement in FIG. 1 and is thus parallel to the moving direction of gondolas 12 in the storage line 6 according to arrow 20. The part of the chain 13 running on top between the deflection rollers 15 and 16 is directed horizontally in the direction of arrow 20. The same applies to the chain 14 of circular conveyor 4 located on the left side. The carrier lugs 19 contact the take up elements 21 located on the right and left sides of each gondola 12. In addition, each gondola 12 comprises right and left pairs of rollers 22 and 23 with respect to each other and having the carrier lugs 21 in between. The upper pair of rollers 22 in the area of the storage line 6 contacts the sliderail 9. Within the storage line 6 the gondolas 12 are guided and supported by the two pairs of rollers 22.

The circular conveyor 5 is constructed in a similar manner and comprises two chains 24 and 25 being located to the right and left of the store 1 in the area of the output station 3. The chain 24 is guided over deflection rollers 26, 27, 28, 29, 30, as is the chain 25. Thus, a conveying plane is spanned by the chain 24 running over the deflection rollers 26, 27, 28, 29, 30. The conveying plane extends parallel to the plane of movement in FIG. 1 and is thus parallel to the moving direction of the gondolas 12 in the storage line 6 according to arrow 20. The chain 25 being located on the other side of the store also creates such a conveying plane. By this it is shown that the essential elements of the circular conveyor 4 and the circular conveyor 5 are located and operate in conveying planes which extend parallel to the drawing plane of FIG. 1 and are thus parallel to the moving direction of the gondolas 12 in the storage line 6 according arrow 20. The chains 24 and 25 are provided with carrier lugs 31 cooperating with the take up elements 21.

A conveyor 32 is located in the area of the input station 2 which may be arranged perpendicularly to the input, or front, side of the store 1. The conveyor 32 may also be located parallel to the input side of the store 1. Individual products 10, in jog mode, arrive from the production machine (not illustrated) to the input of the store. An input slider 33 is allocated to the conveyor 32, which is driven back and forth in the direction of arrow 34 to tranfer the individual pieces 10, in most cases in rows, onto the empty carrier plates 11 on the gondola 12. The conveyor 32 is arranged pivotally around a deflection roller as shown in dotted lines so that its free end 35 facing the store is displaceably mounted in the vertical direction. Instead of the pivotable conveyor 32, another conveyor may be provided which is vertically driven and parallel to carriers 11. In both cases it is possible to bridge the gap between two gondolas, i.e. the distance between the lowest carrier plate 11 of a preceeding gondola 12 and the highest carrier plate 11 of a trailing gondola 12. During the filling of a gondola the conveyor 32 is pivoted upwards in small steps with respect to the number of the carrier plates of a gondola 12. During the gap of the gondolas an upward pivoting motion is carried out with respect to the sum of the individual steps during the upward pivoting motions. Thus, it is possible to displace the individual products 10, arriving continuously and without interruption in rows on the conveyor 32, without interruption, in jog mode, to the carrier plates 11 of the gondolas 12. This displacing motion may even be carried out during the motion of the circular conveyor 4, whereby the free end 35 of the conveyor 32 is moved in the direction of arrow 7 during a small time duration necessary to carry out the transfer motion of the products. If the conveyor 32 is located at input station 2 as shown in FIG. 1, the input slider 33 may be avoided and the transfer action of the individual products may be effected by the end of the conveyor belt running over a deflection roller having a very small diameter.

In the area of the output station 3 an output slider 36 is provided, which shifts the individual products 10 in the direction of arrow 37 from the carrier plates 11 to the conveyor 38. The individual products 10 are further conveyed to a packaging machine or a packaging facility.

In the lower portion of the store is illustrated the lower portion of the storage line serving for conveying and handling purposes of the empty gondolas 12 containing its carrier plates 11. Here another conveying and storage line 39 for handling empty gondolas 12 is provided. Here also sliderails 40 are located to the right and left of gondolas 12, on which the gondolas 12 are moved step by step in hanging condition on the pairs of rollers 23 each. In the area of the sliderails 40 a sluice, not shown, is provided to take out empty gondolas 12 at this point for cleaning purposes and to reintroduce them into the cycle.

The circular conveyor 4 between the deflection rollers 17 and 18 comprises a portion 41 inclined upwardly, which serves to bring into contact the carrier lugs 19 on the chains 13 and 14 with the take up elements, starting from a position below the take up elements 21, and thus to lift the gondolas 12 from the sliderails 40. Between the deflection rollers 15 and 16 there is provided a portion in which the gondolas 12 contact the sliderails 9 via their pairs of rollers 22, so that the carrier lugs 19 come out of contact from the take up elements 21. This may be achieved also by a portion of the sliderail 9 being arranged in an inclined manner.

The circular conveyor 5 between the deflection rollers 26 and 27 is provided with an inclined portion 42 in which the carrier lugs 31 engage the take up elements 21 at the end of storage line 6. Between the deflection rollers 29 and 30 there is provided a portion 43 inclined downwardly. Here the transfer of the gondolas 12 to the sliderails 40 is effected.

Figure 4:
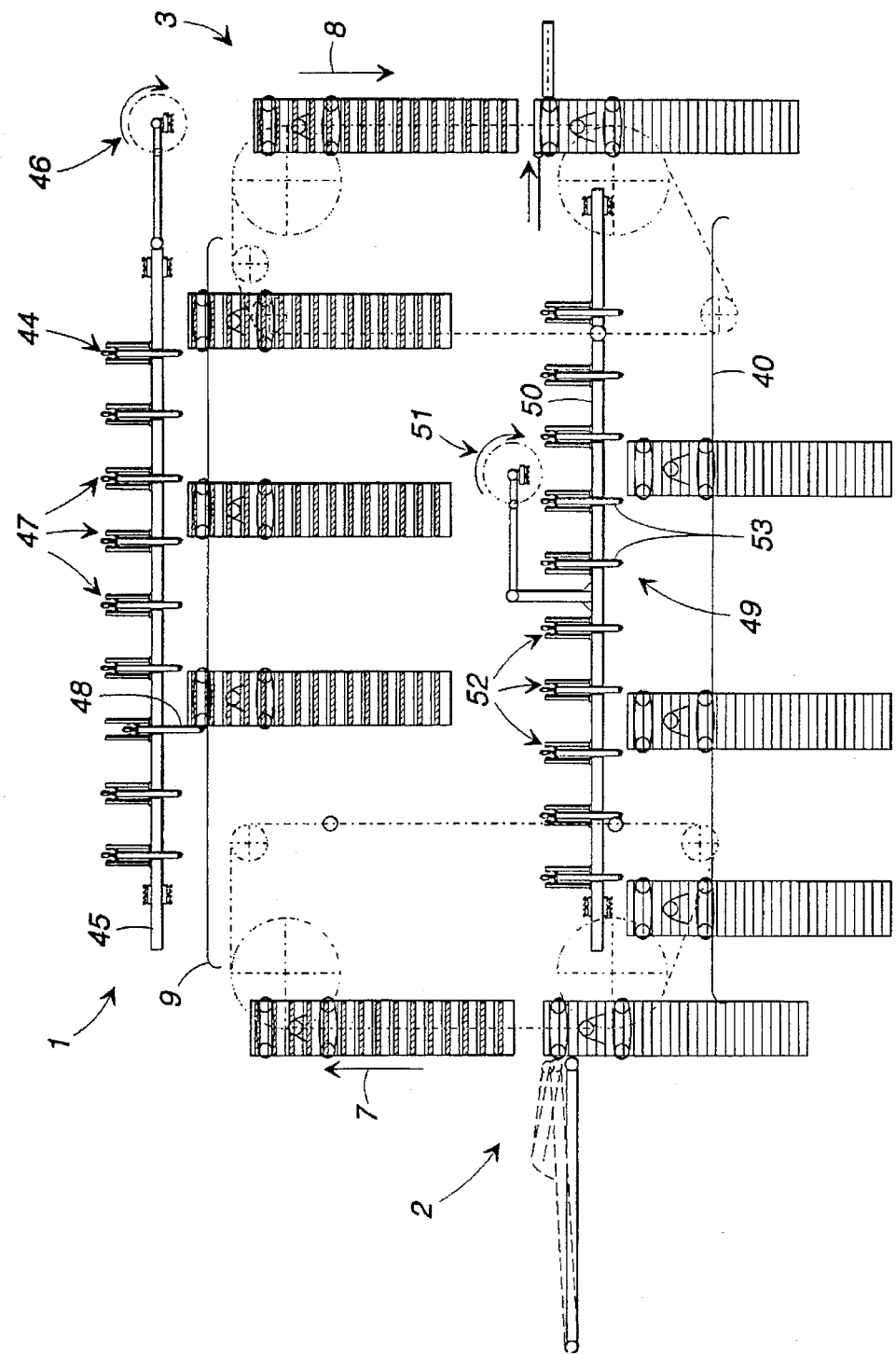

A conveying facility 44 (FIG. 2) is provided for the motion of the filled gondolas 12 within the storage line 6, which comprises a driving rod 45 driven back and forth by a crank drive 46. Pneumatic cylinders 47 are provided on the driving rod 45 spaced with respect to each other according to the spacing of gondolas 12. The piston rods 48 of the pneumatic cylinders 47 may be extended when necessary (FIG. 4) to catch a gondola 12 and to move the gondola 12 during one revolution of the crank drive 46 for one step on the slide rails 9. Thus, the gondolas 12 collect in front of the output station 3 at the end of storage line 6, as illustrated in FIG. 1.

An analogeous conveying facility 49 is provided for the conveying and storage line 39 for empty gondolas 12. A driving rod 50 is driven back and forth by a crank drive 51. The driving rod 50 here also is provided with pneumatic cylinders 52, the piston rods 53 of which may be extended when necessary to catch the gondolas 12 in step by step fashion. Thus, the gondolas 12 become congested on the sliderails 40 when moved forward. It is clear that two pneumatic cylinders, piston rods or contacting points are provided with respect to the width of the gondolas 12, resulting in a guided motion of the gondolas 12 with respect to their vertical medium plane extending longitudinally and perpendicularly to the plane of movement in FIGS. 1 to 4. Thus, the gondolas 12 cannot fall down from the sliderails 9, 40.

Figure 6:
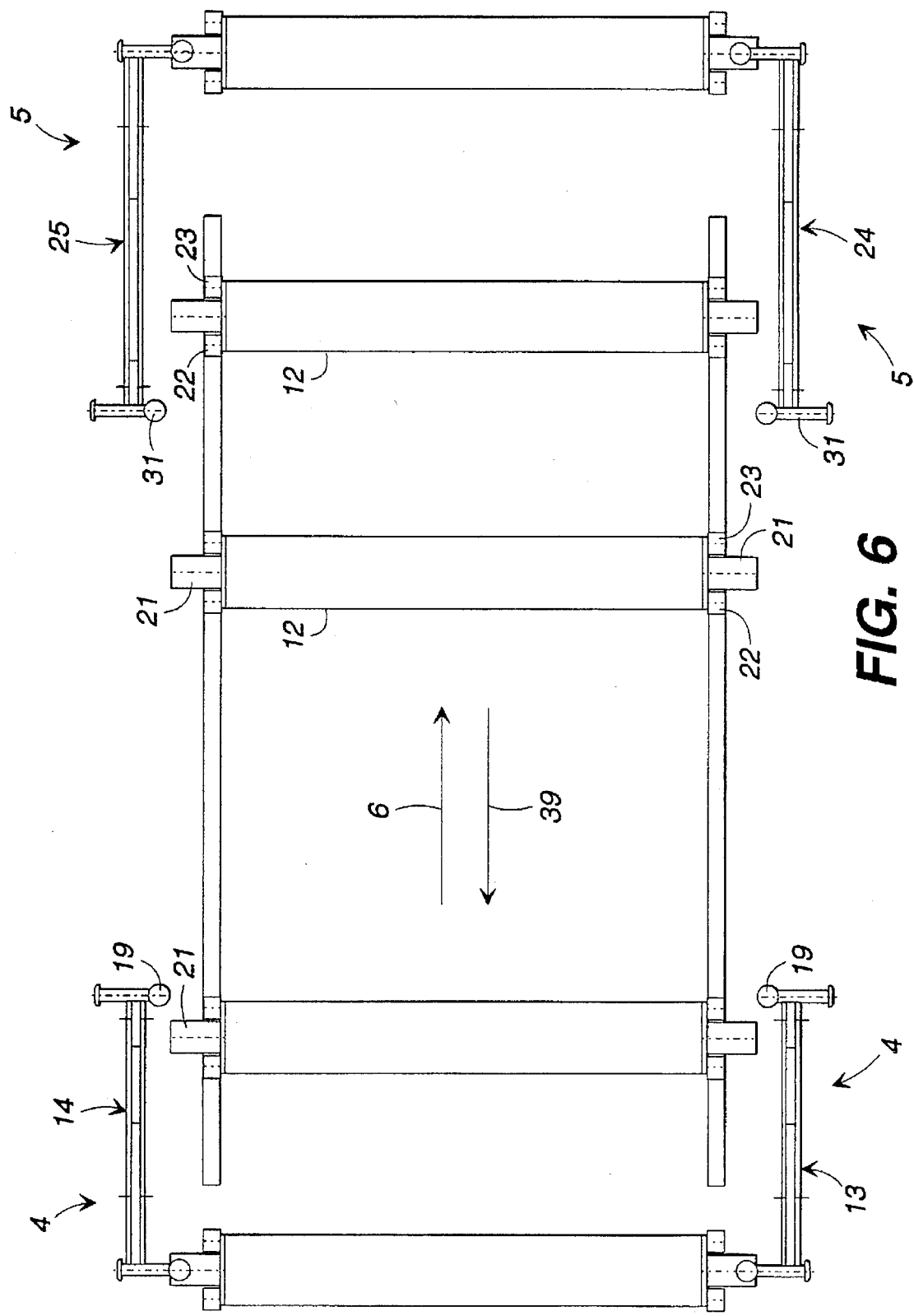

In FIGS. 6 and 7 two embodiments are shown concerning the relative positioning of the individual parts of the circular conveyors 4 and 5 with respect to the storage lines 6 and 39. FIG. 6 illustrates that the conveying planes created by the chains 13, 14, 24, 25 of the circular conveyors 4 and 5 are positioned perpendicularly to the drawing plane, i.e., the path of travel, exactly parallel to the conveying direction in the storage lines 6 and 39. It can be seen that the carrier lugs 19 have to be moved with respect to the conveying planes of the chains 13 and 14 to come into contact or out of contact with the take up elements 21 of the gondolas 12. On the other hand FIG. 7 illustrates that such a cross motion of the carrier lugs 19 and 31 may be avoided. The carrying planes of the chains 13, 14, 24, 25 here are located slightly inclined with respect to the direction of the motion in the storage lines 6 and 39, making it possible to replace the relative motion of the carrier lugs 19 and 31 by this special inclined Positioning. In all cases the circular conveyors 4 and 5 are arranged in a manner to fulfill the functions of input and output elevators and input and output conveyors for the storage lines 6 and 39. The circular conveyors 4 and 5 are provided with separate drives which may be operated independent from each other. Otherwise, the individual drives of the single elements are operated with respect to each other.

OPERATION

Figure 3:
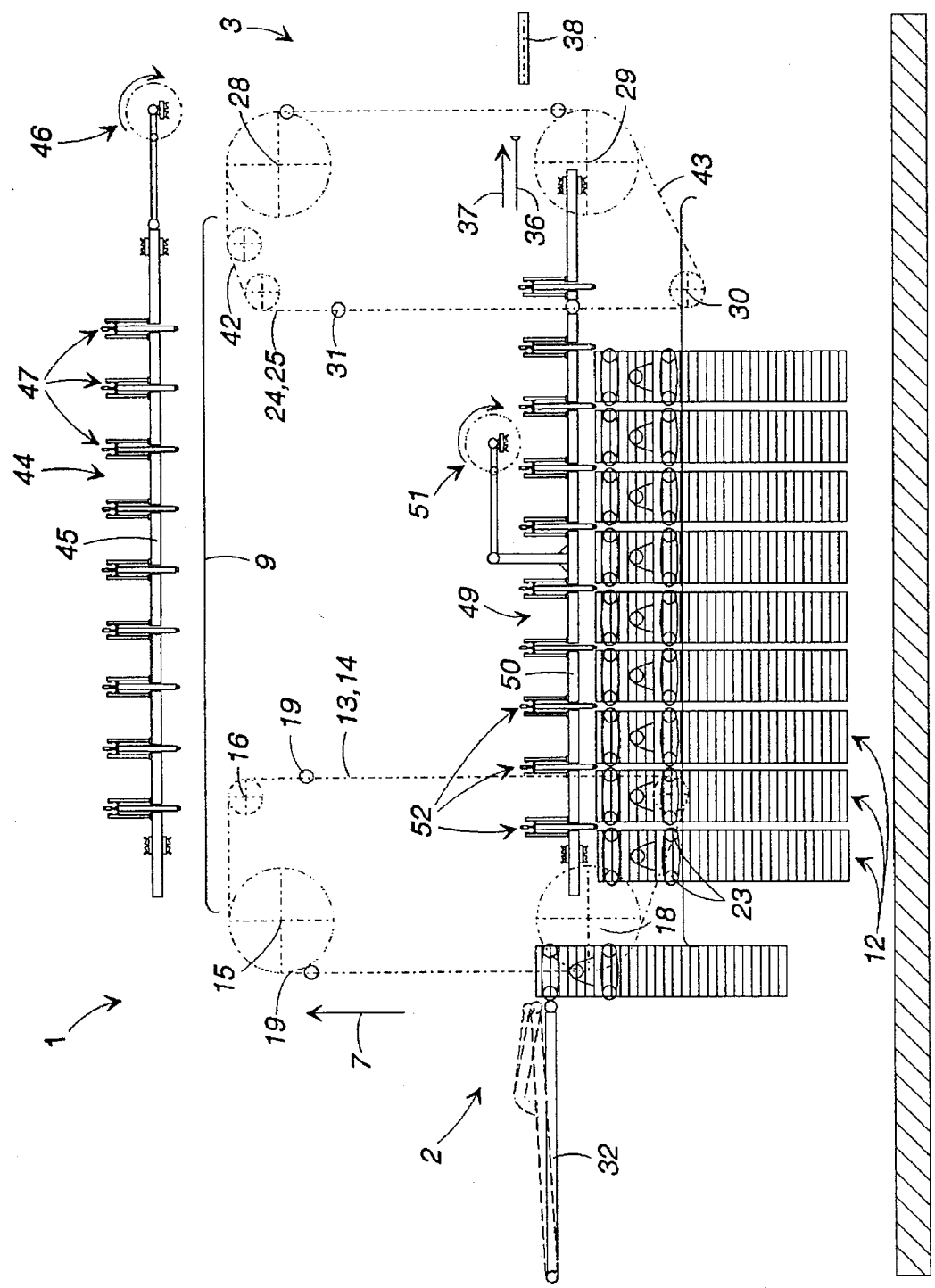

Store 1 is operated as follows:

According to FIG. 3 an empty gondola 12 is caught by the circular conveyor 4 and is conveyed via the deflection rollers 18 in the direction of arrow 7 step by step or continuously in an upward directed motion. Rows of individual products 10 each are conveyed from the conveyor 32 to the carrier plates 11 and shifted there and put down. If all of the carrier plates 11 of a gondola 12 are filled with individual products 10, the next gondola 12 reaches the area of the conveyor 32 (FIG. 4) and the filling of the next gondola 12 occurs without interruption of the arriving of the products on the conveyor 32. The gap between the gondolas is bridged by the vertical motion of the free end 35 of the conveyor 32. During the subsequent filling of the next gondola the preceeding gondola is conveyed over the deflection rollers 15 from a vertical direction into a horizontal direction. This gondola is put down on the sliderails 9 of the storage line 6 on its pairs of rollers 22. The carrier lugs 19 in the area of the deflection rollers 16 come out of contact from the take up elements 21. The gondola 12 or the gondolas 12 are conveyed step by step via the conveying facility 44 according to FIG. 4 in the area of the storage line 6. There is enough time for this motion making it possible that the conveying facility 44 may be driven relatively slowly. The gondolas 12 collect at the end, of the storage line 6, as illustrated in FIG. 1.

Figure 2:
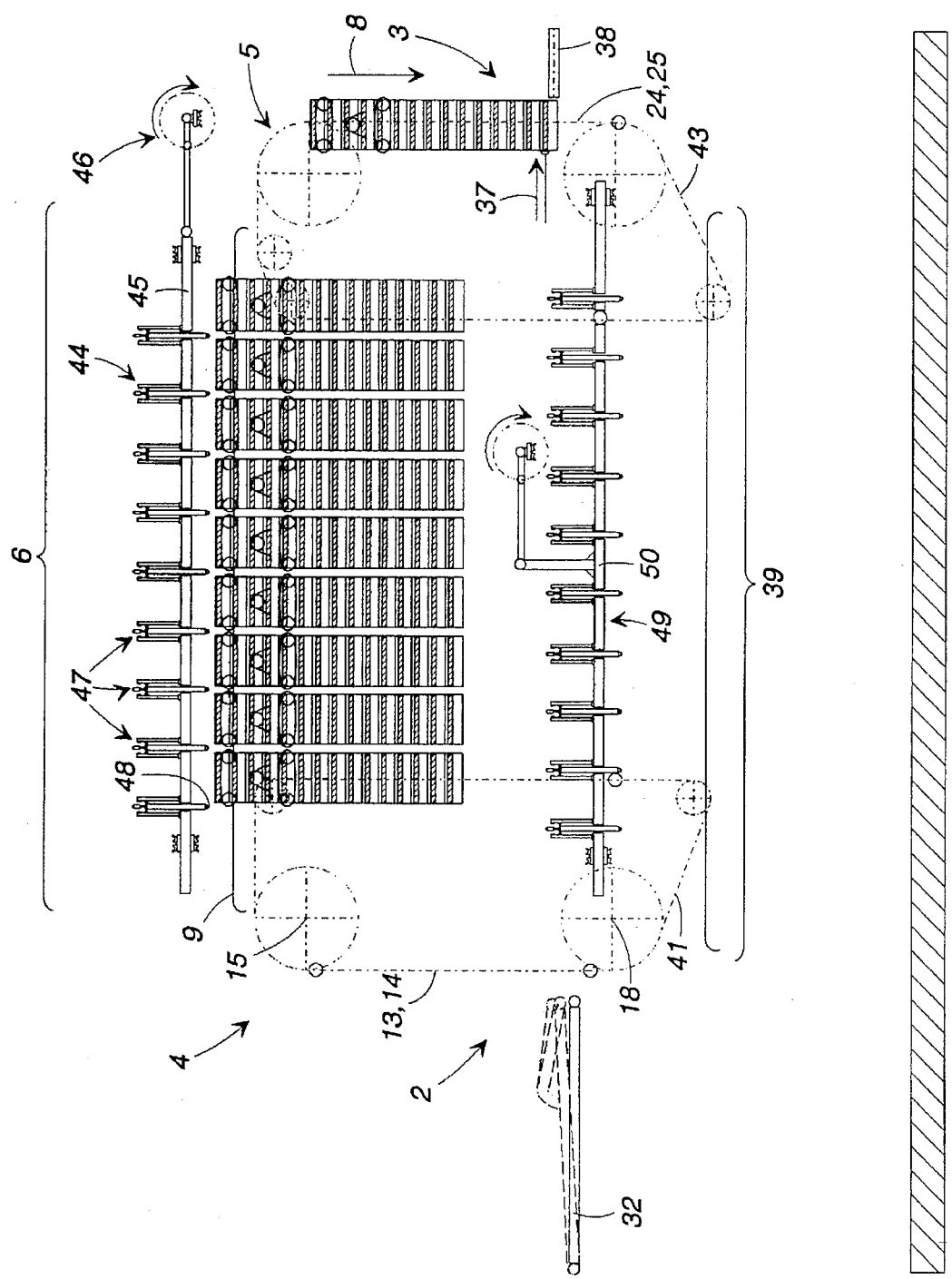

The output from the store 1 may be seen in FIG. 2. In the area 42 of the take up elements 21 of the first gondola of the storage line 6 the circular conveyor 5 contacts with its carrier lugs 31, on the chains 24 and 25, the take up elements 21 and picks up this gondola 12 and conveys it upwardly in the direction of arrow 8. During this time the conveying facility 44 is moved one step resulting in a motion that the gondolas 12 are transferred again to the end of storage line 6. The circular conveyor 5 may be driven step by step whereby the individual products 10 or the rows of products 10 are shifted by the adjusted motion of the output slider 36 in the direction of arrow 37 step by step to the conveyor 38. A completely empty gondola 12 is then put down by the circular conveyor 5 in the region 43 onto the sliderails 40 of conveying and storage line 39. Here the conveying facility 49 is operated in fashion similar to conveying facility 44 so that the empty gondolas collect in front of the end of storage line 39 as illustrated in FIG. 3.

LIST OF REFERENCE NUMERALS

| | |
|---|---|
| 1 | store |
| 2 | input station |
| 3 | output station |
| 4 | circular conveyor |
| 5 | circular conveyor |
| 6 | storage line |
| 7 | arrow |
| 8 | arrow |
| 9 | sliderail |
| 10 | product |
| 11 | carrier plate |
| 12 | gondola |
| 13 | chain |
| 14 | chain |
| 15 | deflection roller |
| 16 | deflection roller |
| 17 | deflection roller |
| 18 | deflection roller |
| 19 | carrier lug |
| 20 | arrow |
| 21 | take up element |
| 22 | pair of rollers |
| 23 | pair of rollers |
| 24 | chain |
| 25 | chain |
| 26 | deflection roller |
| 27 | deflection roller |
| 28 | deflection roller |
| 29 | deflection roller |
| 30 | deflection roller |
| 31 | carrier lug |
| 32 | conveyor |
| 33 | input slider |
| 34 | arrow |
| 35 | end |
| 36 | output slider |

-continued

LIST OF REFERENCE NUMERALS

| | |
|---|---|
| 37 | arrow |
| 38 | conveyor |
| 39 | storage line |
| 40 | sliderail |
| 41 | portion |
| 42 | portion |
| 43 | portion |
| 44 | conveying facility |
| 45 | driving rod |
| 46 | crank drive |
| 47 | pneumatic cylinder |
| 48 | piston rod |
| 49 | conveying facility |
| 50 | driving rod |
| 51 | crank drive |
| 52 | pneumatic cylinder |
| 53 | piston rod |

I claim:

1. A store for articles of product, said store comprising:

an input station and an output station spaced with respect to one another, said input station and said output station each being actuated independently of the other;

an elongated storage line having a variable receiving capacity, said input station and said output station each being positioned along said storage line;

a spaced series of gondolas constructed and arranged for movement on said storage line and being removably supported thereon, each said gondola having a plurality of carrier plates for receiving the articles of product thereon, said carrier plates of each said gondola being spaced vertically with respect to one another;

said storage line including a conveying facility for conveying said gondolas along a path of travel between said input station and said output station;

a first generally circular conveyor positioned at said input station for moving each said gondola through said input station for the placement of the articles of product on said carrier plates;

a second generally circular conveyor positioned at said output station for moving each said gondola through said output station for the removal of the articles of product from said carrier plates;

said first and said second circular conveyors each having at least one carrier lug formed as a part thereof for carrying at least one of said gondolas thereon;

a plurality of deflection rollers, said first and said second circular conveyors each being separately guided on at least three deflection rollers each, said at least three deflection rollers of each said conveyor being positioned in and forming a common conveying plane for both of said conveyors, said common conveying plane being approximately parallel to said path of travel.

2. The store of claim 1, said input station further comprising a feed conveyor for feeding individual work products to the input station and having a free end projecting toward said input elevator, said output station further comprising an output conveyor for conveying individual work products away from said output station and having a free end projecting toward said output elevator, said free ends of said infeed conveyor and of said output conveyor, respectively, each being constructed and arranged for movement in a vertical direction with respect to said gondolas.

3. The store of claim 1, wherein said first and said second circular conveyors, respectively, each comprises a pair of spaced and generally parallel continuous chains positioned one apiece within a first plane to the right, and a second plane to the left, of said input station and said output station, respectively.

4. The store of claim 1, wherein said gondolas are generally horizontally spaced apart a distance with respect to one another, and wherein said carrier plates of each said gondola are generally vertically spaced with respect to one another at a distance approximately half the horizontal distance between each of said gondolas.

5. The store of claim 1, wherein said storage line comprises at least one elongated sliderail constructed and arranged to support said gondolas for movement thereon.

6. The store of claim 5, wherein said storage line includes a sluice constructed and arranged for adding said gondolas to, and for removing said gondolas from, said store.

7. The store of claim 1, wherein said first circular conveyor and said second circular conveyor are guided on at least four deflection rollers each, said at least four deflection rollers of each said conveyor being positioned within said common conveying plane parallel to the path of travel.

8. The store of claim 1, wherein said first circular conveyor is inclined upwardly with respect to said storage line for picking up said gondolas from said storage line on said at least one carrier lug, and wherein said second circular conveyor is inclined upwardly and downwardly with respect to said storage line for picking up said gondolas from said storage line on said at least one carrier lug, and for dropping said gondolas off of said storage line, respectively.

9. The store of claim 1, wherein each said gondola has at least one take up element formed as a part thereof for engagement with said at least one carrier lug of each said circular conveyor, and wherein each said gondola includes a first pair of rollers and a spaced second pair of rollers, said at least one take up element of said conveyors being positioned between said first and said second pairs of rollers as said gondola is carried on each said circular conveyor.

10. The store of claim 1, wherein said first circular conveyor and said second circular conveyor each has a conveying plane inclined with respect to said common conveying plane parallel to the path of travel along said storage line so that said at least one take up element of said gondolas is engaged and released by said at least one carrier lug of each of said circular conveyors.

11. A store for work products, said store comprising:
an input station and an output station spaced with respect to one another, said input station and said output station each being actuated independently of the other;
an elongated storage line having a variable receiving capacity, said input station and said output station each being positioned along said storage line;
a spaced series of gondolas constructed and arranged for movement on said storage line and being removably supported thereon, each said gondola having a plurality of carrier plates for receiving the articles of product thereon, said carrier plates of each said gondola being spaced vertically with respect to one another;
said storage line including a conveying facility for conveying said gondolas along a path of travel between said input station and said output station;
a first generally circular conveyor positioned at said input station for moving each said gondola through said input station for the placement of the articles of product on said carrier plates;
a second generally circular conveyor positioned at said output station for moving each said gondola through said output station for the removal of the articles of product from said carrier plates;
said first and said second circular conveyors each having at least one carrier lug formed as a part thereof for carrying at least one of said gondolas thereon;
a plurality of deflection rollers, said first and said second circular conveyors each being separately guided on at least four deflection rollers each, said at least three deflection rollers of each said conyeyor being positioned in and forming a common conveying plane for both of said conveyors, said common conveying plane being approximately parallel to said path of travel;
wherein said first circular conveyor and said second circular conveyor is each inclined upwardly and downwardly with respect to said storage line so that each said circular conveyor picks up said gondolas from said storage line on said at least one carrier lug and drops said gondolas onto said storage line.

12. A store for work products, said store comprising:
an input station and an output station spaced with respect to one another, said input station and said output station each being actuated independently of the other;
an elongated storage line having a variable receiving capacity, said input station and said output station each being positioned along said storage line;
a spaced series of gondolas constructed and arranged for movement on said storage line and being removably supported thereon, each said gondola having a plurality of carrier plates for receiving the articles of product thereon, said carrier plates of each said gondola being spaced vertically with respect to one another;
said storage line including a conveying facility for conveying said gondolas along a path of travel between said input station and said output station;
a first generally circular conveyor positioned at said input station for moving each said gondola through said input station for the placement of the articles of product on said carrier plates;
a second generally circular conveyor positioned at said output station for moving each said gondola through said output station for the removal of the articles of product from said carrier plates;
said first and said second circular conveyors each having at least one carrier lug formed as a part thereof for carrying at least one of said gondolas thereon;
each of said gondolas having at least one take up element for engagement with said at least one carrier lug of said first and of said second circular conveyors;
a plurality of deflection rollers, said first and said second circular conveyors each being separately guided on at least three deflection rollers each, said at least three deflection rollers of each said conyeyor being positioned in and forming a common conveying plane for both of said conveyors, said common conveying plane being approximately parallel to said path of travel;
wherein said first circular conveyor and said second circular conveyor each has a conveying plane inclined with respect to said common conveying plane parallel to the path of travel so that said at least one take up element of each said gondola is engaged and released by said at least one carrier lug of each of said circular conveyors, respectively.

13. A store for work products, said store comprising:
an input station and an output station spaced with respect to one another, said input station and said output station each being constructed and arranged for actuation independently of the other;

a first elongated storage line having a variable receiving capacity extending from said input station to said output station;

a second elongated storage line having a variable receiving capacity extending from said output station to said input station;

a spaced series of gondolas constructed and arranged for movement along and removably supported on said first and said second storage lines, each said gondola having a plurality of carrier plates for receiving the work products thereon;

said first storage line and said second storage line each being constructed and arranged to support said gondolas for movement between said input station and said output station in a generally circular path of travel through said store;

a first generally circular conveyor positioned at said input station, said first circular conveyor being constructed and arranged to separately lift said gondolas off of said second storage line, move said gondolas through said input station, and then place said gondolas onto said first storage line;

a second generally circular conveyor positioned at said output station, said second circular conveyor being constructed and arranged to separately lift said gondolas off of said first storage line, move said gondolas through said output station, and then place said gondolas onto said second storage line.

* * * * *